United States Patent [19]

Linke

[11] Patent Number: 4,972,514

[45] Date of Patent: Nov. 20, 1990

[54] FULL DUPLEX LIGHTWAVE COMMUNICATION SYSTEM

[75] Inventor: Richard A. Linke, Holmdel, N.J.

[73] Assignee: AT&T Bell Laboratories, Murray Hill, N.J.

[21] Appl. No.: 308,175

[22] Filed: Feb. 8, 1989

[51] Int. Cl.$^5$ .............................. G02F 2/00; H01S 3/00; H04B 10/00

[52] U.S. Cl. ................................... 455/606; 455/607; 455/611; 372/38

[58] Field of Search ..................... 455/606, 611, 607; 350/96.15, 96.16; 372/29, 38

[56] References Cited

U.S. PATENT DOCUMENTS

| | | | |
|---|---|---|---|
| 4,824,201 | 4/1989 | Kazovsky | 455/611 |
| 4,860,294 | 8/1989 | Winzer et al. | 372/50 |
| 4,882,771 | 11/1989 | Rocks | 455/606 |

OTHER PUBLICATIONS

R. F. Kazarinov et al., Sov. Physc.-JETP, vol. 39, No. 3, Sep. 1974 "Heterodyne Reception of Light by an Injection Laser", pp. 522–527.

*Primary Examiner*—Joseph A. Orsino
*Assistant Examiner*—Kinfe-Michael Negash
*Attorney, Agent, or Firm*—Gregory C. Ranieri

[57] ABSTRACT

Full duplex operation is achieved in a lightwave communication system by employing terminals having a distributed Bragg reflector (DBR) laser having separate electrically controllable Bragg reflector and gain sections. While operating as the basic heterodyne reception element, the DBR laser simultaneously generates lightwave signals for transmission to other terminals. External circuits process the electrical (intermediate frequency) signals from the simultaneously modulated and signal mixing laser to extract received information. In one embodiment, full duplex operation is described for an FSK lightwave communication system.

10 Claims, 2 Drawing Sheets

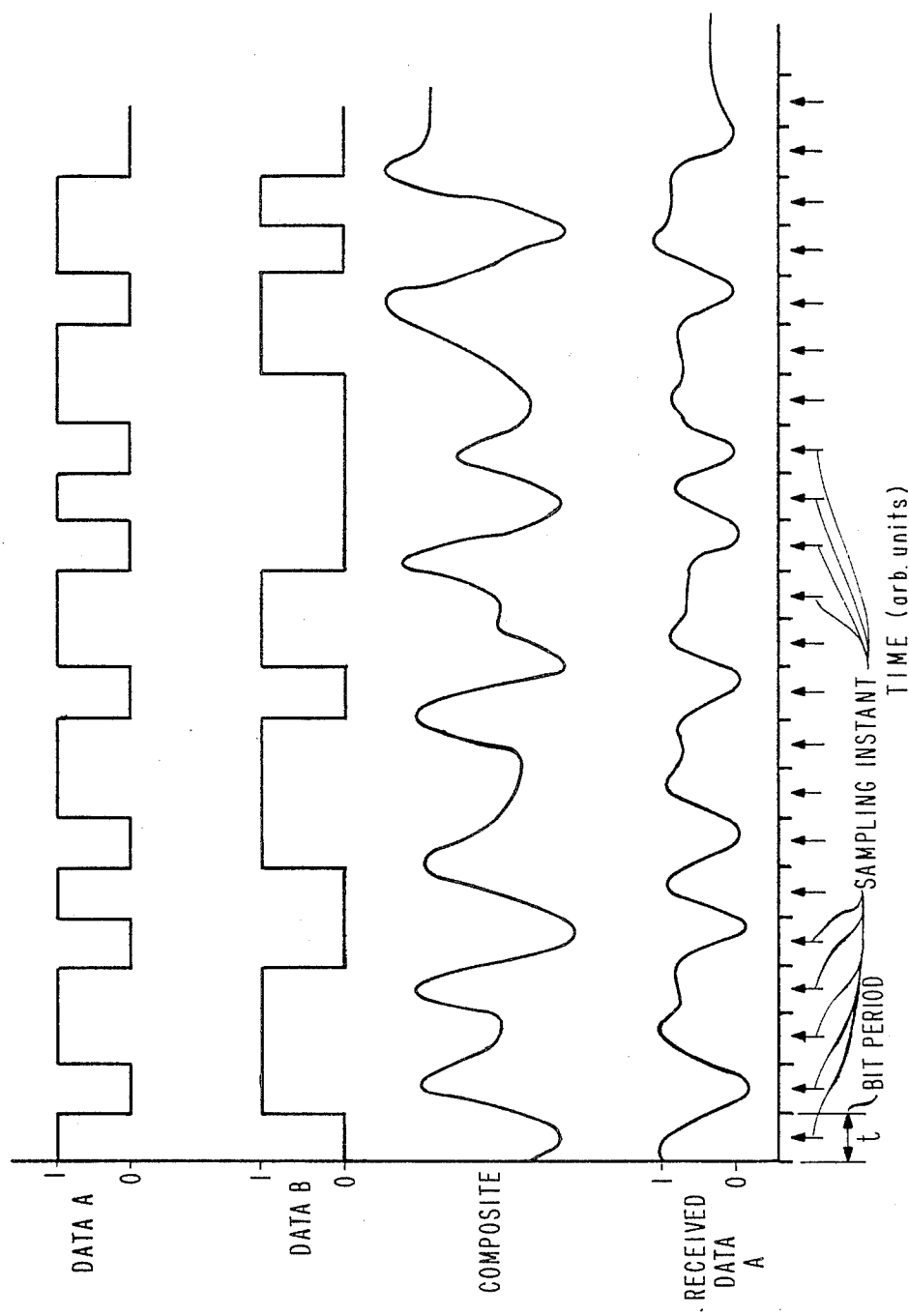

FULL DUPLEX LIGHTWAVE COMMUNICATION SYSTEM

TECHNICAL FIELD

This invention relates to lightwave communication systems and, more particularly, to systems employing multi-electrode laser structures.

BACKGROUND OF THE INVENTION

Coherent lightwave communication systems have grown in interest as the wavelength stability, wavelength tunability and manufacturable reproducibility of semiconductor lasers has been improved. In most coherent lightwave communication systems, optical heterodyning has been the suggested reception technique. In an optical heterodyne receiver, received lightwave signals and lightwave signals from a local oscillator are directed onto a photodetector. See S. D. Personick, *Fiber Optics: Technology and Applications*, pp. 242–245 (Plenum Press 1985). If the frequencies of the received and local oscillator lightwave signals differ, the resulting lightwave signals experience beating at a frequency corresponding to the difference in frequency of the received and local oscillator lightwave signals. Electronic (intermediate frequency) signals resulting from this interaction are directed to a square law mixer (for intensity or amplitude modulated signals) for further processing and detection. Beating causes oscillation in the photoresponse of the detector at the same difference frequency.

In a proposed optical heterodyne receiver, received lightwave signals are directed onto a semiconductor laser biased above threshold to interfere with lightwave signals being produced therein via optical mixing. See *Sov. Phys.-JETP*, Vol. 39, No. 2, pp. 522–7 (1974).

In such systems, whether real or proposed, the semiconductor laser has been operated primarily as dedicated receiver. As a result, another laser source is necessary to produce lightwave signals for full duplex of half duplex transmission on either communication system. Such a duplication is costly in that it doubles laser and electronic drive circuit costs plus it requires additional mounting and optics to handle separate reception and transmission.

SUMMARY OF THE INVENTION

Full duplex operation is achieved in a lightwave communication system by employing terminals having a distributed Bragg reflector (DBR) laser having separate electrically controllable Bragg reflector and gain sections. While operating as the basic heterodyne reception element, the DBR laser simultaneously generates lightwave signals for transmission to other terminals. External circuits process the electrical (intermediate frequency) signals from the simultaneously modulated and signal mixing laser to extract received information.

In one embodiment, full duplex operation is described for an FSK lightwave communication system.

BRIEF DESCRIPTION OF THE DRAWING

A more complete understanding of the invention may be obtained by reading the following description of a specific illustrative embodiment of the invention in conjunction with the appended drawing in which:

FIG. 2 shows plots of various exemplary data signals in the lightwave communication system of FIG. 1.

DETAILED DESCRIPTION

Figure 1:
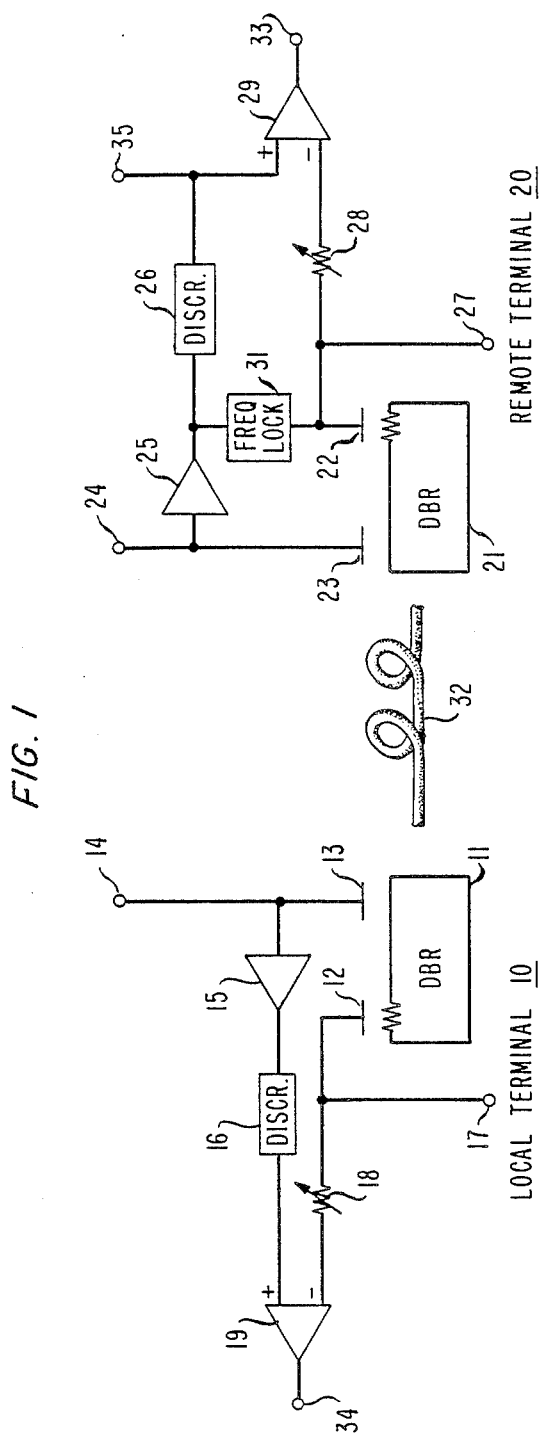
FIG. 1 shows an exemplary embodiment of a full duplex, FSK lightwave communication system in accordance with the principles of the present invention.

Heterodyne reception using a semiconductor laser while performing simultaneous lightwave transmission from the same semiconductor laser is the principle at the heart of the present invention. Heterodyning the incoming lightwave signal in the resonant laser cavity while simultaneously modulating the same laser cavity with the data signal to be transmitted causes the various lightwave signals to interfere within the laser cavity. Since the interference is deterministic, it may be extracted from a composite signal which represents the interfering signals.

While the invention is shown realized by a distributed Bragg reflector laser, it is contemplated that distributed feedback lasers having one or more electrode sections and other heterostructure lasers having stripe contact electrodes are capable of performing in the lightwave system in accordance with the principles of the invention. Other structures such as buried ridge, crescent or V-groove, double channel planar buried heterostructure, semi-insulating blocking region planar buried heterostructure and the like are contemplated for use as embodiments of the laser structure. By employing lasers having separate electrically controllable sections such as a multiple electrode distributed Bragg reflector (DBR) laser or multiple electrode multiple-quantum-well (MQW) DBR laser, it is possible to provide simultaneous transmission and coherent reception with the same laser structure in accordance with the principles of the present invention.

Details about fabrication and operation of DBR and MQW-DBR lasers including two- and three-section (electrode) devices are available in *Appl. Phys. Lett.*, 53 (12), pp. 1036–8 (1988), and *Elect. Lett.*, Vol. 24, No. 23, pp. 1431–2 (1988) (three section devices having a phase control section). The teachings of these references are expressly incorporated herein by reference.

While the embodiment to be described hereinbelow relates to an exemplary FSK modulation lightwave system, it is understood that the principles and teachings of the present invention are equally applicable to other forms of modulation such as intensity or amplitude modulation and the like. Moreover, even though only binary modulation (two-level or two-frequency) is disclosed, it is understood that the principles of the invention are directly applicable to multi-level (M-ary) modulation systems. In the case of intensity or amplitude modulation systems, it is understood that modulation levels may be required to be less than 100% to insure proper operation as a heterodyne receiver.

FIG. 1 shows a simplified diagram of a lightwave communication system employing FSK modulation and heterodyne reception at local terminal 10 and at remote terminal 20. The lightwave communication system also includes transmission medium 32 for supporting bidirectional propagation of lightwave signals between local terminal 10 and remote terminal 20. Remote is intended to mean any location away from the transmitter either in a microscopic sense such as being collocated on the same semiconductor chip or in a macroscopic sense such as being geographically separated.

Local terminal 10 includes DBR laser 11 having a gain section controlled via electrode 13 and a Bragg section controlled via electrode 12. Bias signals for heterodyne operation are applied to DBR laser 11 via terminal 14. Data signals such as data signal A (see FIG. 2) is applied to the Bragg section of DBR laser 11 via terminal 17. Local terminal 10 also includes amplifier 15 connected to gain section electrode 13, discriminator 16 connected to the output of amplifier 15 and difference amplifier 19 connected to the output of discriminator 16 and via variable impedance element 18 to terminal 17. When the lightwave signal representation of data signal B (see FIG. 2) is transmitted from remote terminal 20 to local terminal 10, local terminal 10 outputs a representation of data signal B at terminal 34 which is the output of difference amplifier 19.

Remote terminal 20 includes DBR laser 21 having a gain section controlled via electrode 23 and a Bragg section controlled via electrode 22. Bias signals for heterodyne operation are applied to DBR laser 21 via terminal 24. Data signals such as data signal B (see FIG. 2) are applied to the Bragg section of DBR laser 21 via terminal 27. Remote terminal 20 also includes amplifier 25 connected to gain section electrode 23, discriminator 26 connected to the output of amplifier 25 and difference amplifier 29 connected to the output of discriminator 26 and via variable impedance element 28 to terminal 27. When the lightwave signal representation of data signal A (see FIG. 2) is transmitted from local terminal 10 to remote terminal 20, remote terminal 20 outputs a representation of data signal A at terminal 33 which is the output of difference amplifier 29. In order to provide a substantially equal offset between the frequencies of lasers 11 and 21, it is necessary to include frequency locking circuit 31 having its input connected to the output of amplifier 25 and having its output connected to Bragg section electrode 22.

Both the discriminator elements and the frequency lock element are well known to those skilled in the art. The discriminator is known to convert an intermediate frequency frequency-modulated signal into a corresponding baseband amplitude-modulated signal. The function of the frequency lock element has been described above.

Remote terminal 20 includes terminal 35 at the output of discriminator 26. The signal labeled "composite" in FIG. 2 is available at terminal 35. The composite signal at terminal 35 includes superimposed representations of signal A and signal B as seen from a laser electrode 23. Difference amplifier 29 allows data signal B to be extracted from the composite signal leaving a representation of data signal A at the output of difference amplifier 29, namely, terminal 33. See FIG. 2, signal labeled "received data A". By sampling at the instants marked by the up arrow in FIG. 2, it is possible to obtain truly quantized representations of received data signal A.

It is contemplated that remote terminal 20 and local terminal 10 may operate at vastly different data rates for their corresponding data signals.

I claim:

1. A lightwave transceiver responsive to a first lightwave signal for generating a first data signal and separately responsive to a second data signal for generating a second lightwave signal, said lightwave transceiver including
   a semiconductor laser structure being controllable from first and second electrodes and being biased electrically above a lasing threshold via the first electrode for heterodyne reception of said first lightwave signal in said semiconductor laser structure, said second data signal supplied to said semiconductor laser structure via the second electrode,
   means connected to the first electrode of the semiconductor laser structure and being responsive to electrical signal variations caused substantially by said heterodyne reception for producing a composite data signal,
   means jointly responsive to said second data signal and to said composite data signal for generating a representation of said first data signal.

2. The transceiver defined in claim 1 further including means responsive to electrical signals from the first electrode of said semiconductor laser structure for correcting offset of an operating frequency of the distributed Bragg reflector laser structure by applying a predetermined electrical signal to the second electrode, so that said first and second lightwave signals are substantially equally offset with respect to their transmission frequencies.

3. The transceiver defined in claim 1 wherein said composite signal producing means includes a discriminator for frequency demodulating said electrical signal variations.

4. The transceiver defined in claim 2 wherein said composite signal producing means includes a discriminator for frequency demodulating said electrical signal variations.

5. A lightwave transceiver responsive to a first lightwave signal for generating a first data signal and separately responsive to a second data signal for generating a second lightwave signal, said lightwave transceiver including
   a semiconductor laser structure being individually controllable from first and second electrodes and being biased electrically above a lasing threshold via the first electrode for heterodyne reception of said first lightwave signal in said semiconductor laser structure, said second data signal supplied to said laser structure via the second electrode,
   means connected to said first electrode and being jointly responsive to electrical signal variations caused substantially by said heterodyne reception of said first lightwave signal and to said second data signal for generating a representation of said first data signal.

6. A lightwave transceiver responsive to a first lightwave signal for generating a first data signal and separately responsive to a second data signal for generating a second lightwave signal, said lightwave transceiver including
   a distributed Bragg reflector laser structure having a gain section and a Bragg section coupled optically to said gain section, each section including an electrode for individually controlling the section, said gain region being biased electrically above a lasing threshold via the electrode of the gain section for heterodyne reception in said distributed Bragg reflector laser structure of said first lightwave signal, said second data signal supplied to said Bragg section via the electrode of the Bragg section,
   means connected to the electrode of the gain section and being responsive to electrical signal variations caused substantially by said heterodyne reception for producing a composite data signal,
   means jointly responsive to said second data signal and to said composite data signal for generating a representation of said first data signal.

7. The transceiver defined in claim 6 further including means responsive to electrical signals from the electrode of said gain region for correcting an operating frequency of the distributed Bragg reflector laser structure by applying a predetermined electrical signal to the electrode for said Bragg section, so that said first and second lightwave signals exhibit a substantially equal amount of offset with respect to their transmission frequencies.

8. The transceiver defined in claim 1 wherein said composite signal producing means includes a discriminator for frequency demodulating said electrical signal variations.

9. The transceiver defined in claim 7 wherein said composite signal producing means includes a discriminator for frequency demodulating said electrical signal variations.

10. A lightwave transceiver responsive to a first lightwave signal for generating a first data signal and separately responsive to a second data signal for generating a second lightwave signal, said lightwave transceiver including a distributed Bragg reflector laser structure having a gain section and a Bragg section coupled optically to said gain section, each section including an electrode for individually controlling the section, said gain region being biased electrically above a lasing threshold via the electrode of the gain section for heterodyne reception of said first lightwave signal in said distributed Bragg reflector laser structure, said second data signal supplied to said Bragg section via the electrode of the Bragg section, means connected to the electrodes for the gain and Bragg sections and being jointly responsive to electrical signal variations caused substantially by said heterodyne reception of said first lightwave signal and to said second data signal for generating a representation of said first data signal.

* * * * *